(12) United States Patent
Liu et al.

(10) Patent No.: US 8,248,913 B1
(45) Date of Patent: Aug. 21, 2012

(54) SYSTEM AND METHOD TO SUPPORT FULL-TIME PROTECTION SERVICES IN A NETWORK

(75) Inventors: Stephen Shyan-Shiang Liu, Acton, MA (US); Lily F. Chen, Fort Lee, NJ (US)

(73) Assignee: Verizon Services Corp., Ashburn, VA (US)

( * ) Notice: Subject to any disclaimer, the term of this patent is extended or adjusted under 35 U.S.C. 154(b) by 1874 days.

(21) Appl. No.: 11/159,480

(22) Filed: Jun. 23, 2005

(51) Int. Cl.
*G01R 31/08* (2006.01)
*H04L 12/56* (2006.01)
(52) U.S. Cl. ............. 370/216; 370/252; 370/401; 714/2
(58) Field of Classification Search .......... 370/216–218, 370/221, 225, 228, 252, 389, 392, 400, 401; 714/2
See application file for complete search history.

(56) References Cited

U.S. PATENT DOCUMENTS

| | | | |
|---|---|---|---|
| 6,567,194 B1 | 5/2003 | Badr | |
| 6,674,755 B1 | 1/2004 | Potter et al. | |
| 6,690,644 B1 | 2/2004 | Gorshe | |
| 6,760,302 B1 | 7/2004 | Ellinas et al. | |
| 6,771,849 B1 | 8/2004 | Fang et al. | |
| 6,771,908 B2 | 8/2004 | Eijk et al. | |
| 6,775,228 B1 | 8/2004 | Solana De Quesada | |
| 6,775,477 B2 | 8/2004 | Badr | |
| 6,856,594 B1 | 2/2005 | Aihara et al. | |
| 6,996,065 B2 * | 2/2006 | Kodialam et al. | 370/252 |
| 7,126,908 B1 * | 10/2006 | Lu et al. | 370/228 |
| 7,965,620 B2 * | 6/2011 | Gadgil et al. | 370/216 |
| 2005/0237950 A1 * | 10/2005 | Yuan et al. | 370/225 |

* cited by examiner

*Primary Examiner* — Kerri Rose

(57) ABSTRACT

Systems and methods are provided to implement a full-time protection mechanism and a new class of service offerings based on mechanisms to achieve an 'always protected' type of transport service for a networking environment where there may be multiple failures or synchronized attacks. This suite of services may utilize intelligent control plane technology in the optical transport network to support an 'always on' protection capability.

19 Claims, 14 Drawing Sheets

SYSTEM AND METHOD TO SUPPORT FULL-TIME PROTECTION SERVICES IN A NETWORK

BACKGROUND INFORMATION

Traditional transport services in a connection-oriented network offer limited protection capabilities for services riding over the network. These protection schemes generally use a pre-planned protection path to back up the working path, thus only providing back up protection for the first failure. As a result, protection from subsequent failures is generally not supported. For example, to guarantee fast protection switching performance (e.g., <100 ms), three commonly used protection schemes are '1+1 protection,' '1:1 protection,' and '1:N protection.'

A service with 1+1 protection provides a customer with a pair of dedicated 'working' and 'protect' paths. With 1+1 protection, when the working path fails, a switchover to the protect path will occur enabling the customer to still receive its service. In the transport network, the protect path is pre-allocated, reserved, dedicated bandwidth which is used to simultaneously carry the same traffic as the working path.

A service with 1:1 protection provides a customer with a 'working' path and a shared 'protect' path. The scheme allows the protection path to be used to carry other preemptable traffic when the working path is in a normal operating mode. When the working path fails, the scheme will preempt the existing traffic on the protection path, then switch traffic on the previous working path over to the protect path enabling the customer to still receive its service. With 1:1 protection, the protection path is pre-allocated, but its bandwidth can be shared with other preemptable traffic.

A service with 1:N protection provides a single 'protection' path (either shared or dedicated) to protect N customers' 'working' paths. When any one of the N working paths fails, the scheme will switch in the protection path to replace the failed working path. When all N working paths are in normal state, the protection path can carry other preemptable traffic, just as the 1:1 scheme does.

Three common limitations with current protection schemes and services are (1) When the protect path becomes the 'active' path (i.e., the new 'working' path), effectively, there is no continuation of the same protection provided to the customer should the new 'active' path fail and the original failed path has not been repaired, (2) When the protect path fails while the working path operates normally, the protection for the working path is lost, and (3) When both working and protect paths fail, the communication is totally disrupted.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION OF PREFERRED EMBODIMENTS

Figure 1A:
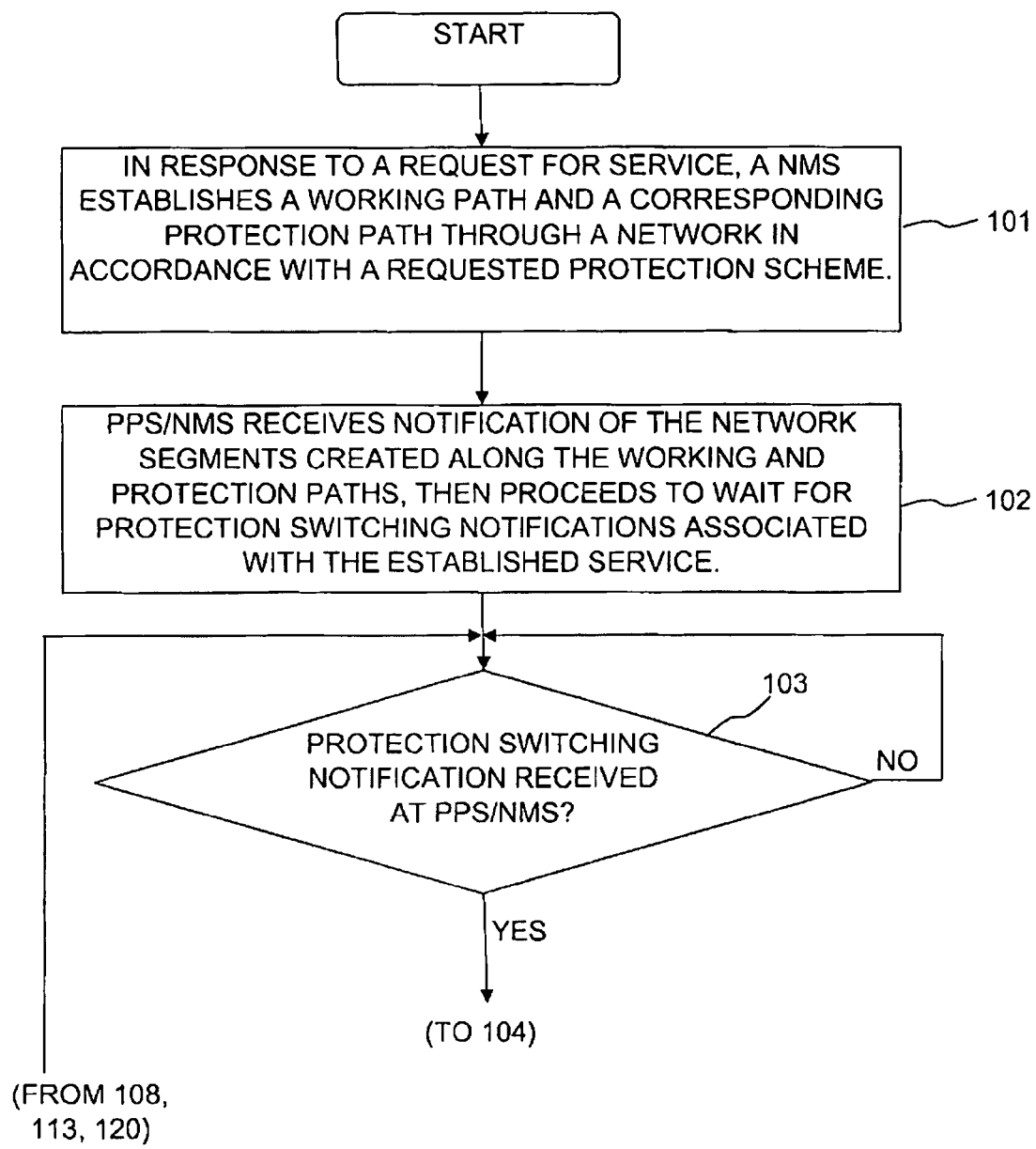
FIGS. 1A-1D show a high-level process flow diagram for providing full-time protection services in accordance with one embodiment of the present invention.
Figure 1B:
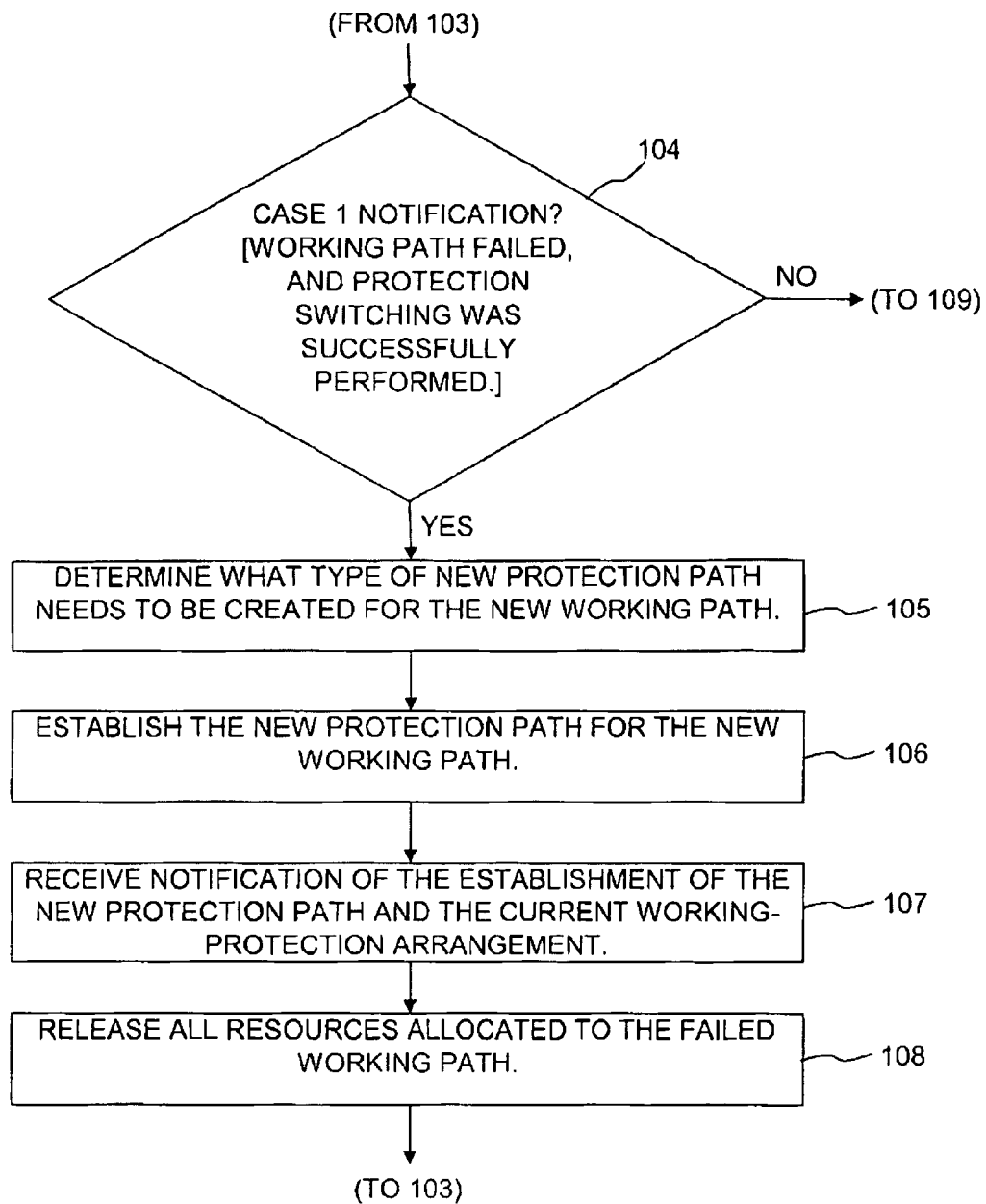
Figure 1C:
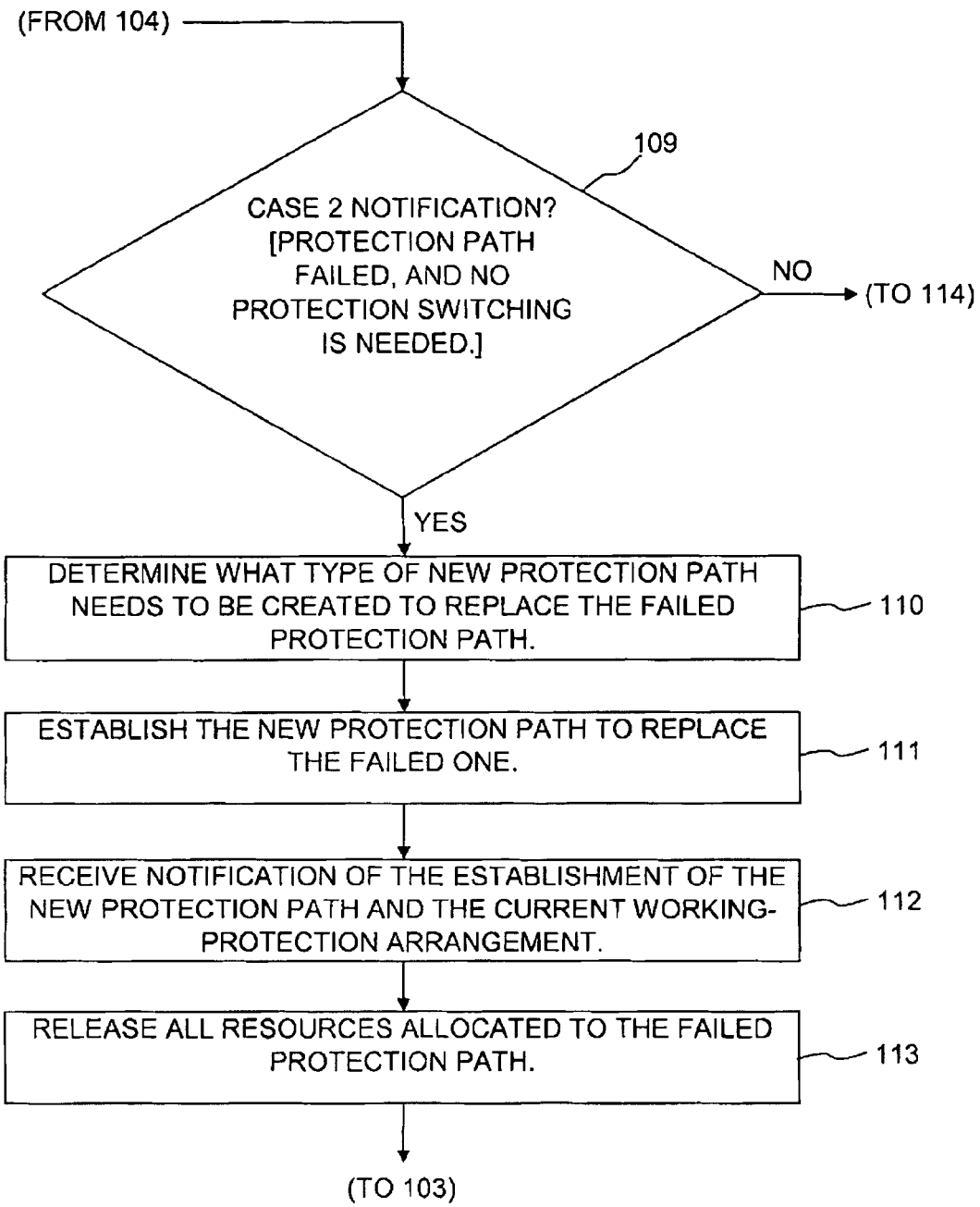
Figure 1D:
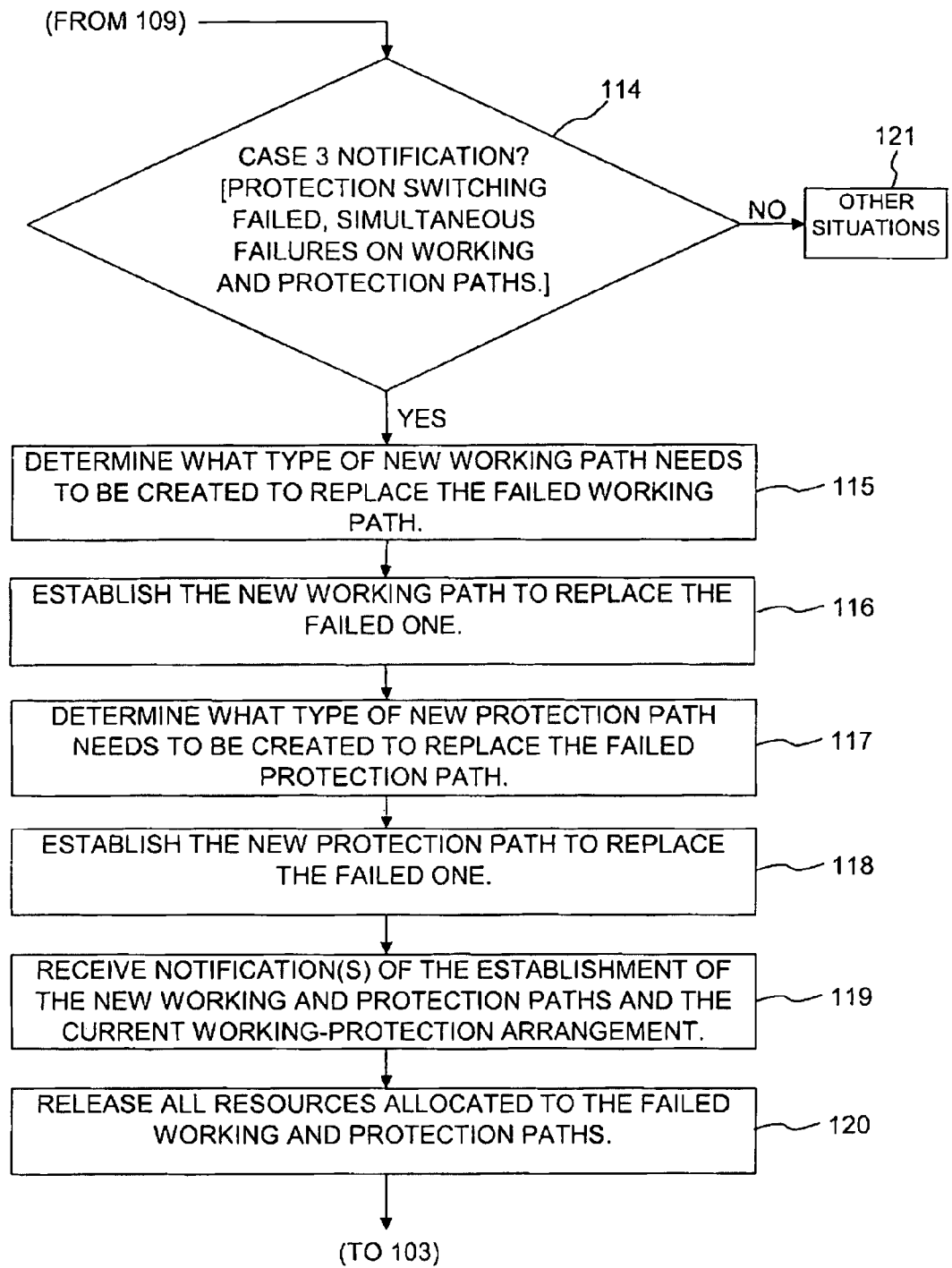

The preferred embodiments according to the present invention(s) now will be described more fully hereinafter with reference to the accompanying drawings, in which some, but not all embodiments of the invention(s) are shown. Indeed, the invention(s) may be embodied in many different forms and should not be construed as limited to the embodiments set forth herein; rather, these embodiments are provided so that this disclosure will satisfy applicable legal requirements. Like numbers refer to like elements throughout.

Embodiments of the present invention can be used to provide a full-time protection mechanism and a new class of service offerings based on mechanisms to achieve an 'always protected' type of transport service for a networking environment where there may be multiple failures or synchronized attacks. In one embodiment, this suite of services can utilize intelligent control plane technology in an optical transport network to support an 'always on' protection capability. For example, when there is a failure of the working path and a switchover to the 'protect' (or protection) path occurs, a request can be sent to the control plane in the optical transport network to create a new protect path in the network.

By automatically creating a new protect path in response to the occurrence of a protection switching event, the system ensures that a protect path will be available in case of yet another failure. Each new protect path can be created as needed, thus enabling a customer to continue to have protection for their service regardless of how many failures may occur. Such embodiments may provide carriers with the ability to offer, for example, new protection services and service level agreements for transport-based services (e.g., private line, Ethernet, SAN, wavelength), for data services (e.g., Layer 2 Ethernet, IP-VPN), and for other higher layer service offerings (e.g., Services over IP, Voice over IP). Embodiments implemented according to the present invention are capable of enhancing the current 'two-strike and out' protection mechanisms by providing an 'always on' protection capability. Furthermore, this capability does not require pre-reserved 'dedicated' bandwidth. Instead, the bandwidth allocated to each new protect path may be selected dynamically from a pool of available bandwidth resources in the network.

As will be described in further detail below, architectures implemented in accordance with the present invention may include the use of an intelligent control plane in a connection-oriented network, and a 'protection policy server' for use in carrying out some or all of the decision making processes associated with coordinating the dynamic establishment of protection (and working) paths in a timely manner. In one embodiment, the network through which such paths are created may be the optical transport network (OTN). As would be readily understood by one of ordinary skill in the art, network elements that comprise the optical transport network include, but are not limited to, next-generation SONET (NG-SONET), multi-service provisioning platforms (MSPP), next-generation dense wave division multiplexing (NG-DWDM), reconfigurable add/drop multiplexers (ROADM), and wavelength switching network elements.

Nearly all next-generation optical-transport-network platforms support an intelligent control plane. The control plane in, for example, the optical transport network generally includes those functions related to networking control capabilities such as routing, signaling, and resource and service discovery, to name just a few. An intelligent control plane used in connection with embodiments of the present invention would preferably support some or all of the following capabilities: auto-discovery and self-inventory of network resources, topology, and connection map; end-to-end path calculations subject to traffic engineering constraints; dynamic end-to-end path setup and teardown in a single-step and single-ended fashion; and support for a variety of protection and restoration schemes. Upon request, the control plane can be used to establish both working and protect paths through the network. The request to provision such paths may be based on a request from either a management system or a client device, for example. If the request is issued from a management system, the management system may be an element management system (EMS), a network management system (NMS), an operations support system (OSS), or any other management system that may be known or in use at the time.

As indicated above, the 'protection policy server,' as the term is used herein, can be a component in the network that carries out some or all of the decision-making processes associated with coordinating the dynamic establishment of protection and/or working paths in a timely manner. In one embodiment, all protection paths can be established by the OTN control plane using specific routing or path constraints based on the current resources and characteristics of the network. The protection policy server (PPS) may be a standalone software module, or, in another embodiment, it may be integrated into either a network management system or an operations support system. In yet another embodiment, the PPS may be a collection of interactive components distributed throughout the network. The purpose of the protection policy server is to function as the controller that keeps track of the working and the corresponding protect (or protection) paths, and to determine when to notify the control plane to set up new protect (or working) paths. In determining what types of new protect paths need to be created, the protection policy server can maintain information on the protection and restoration policies associated with each existing service. This may include, but is not limited to, information such as explicit routing constraints, link cost, pre-emption, and diversity requirements. It may also include information pertaining to service level guarantees such as latency requirements.

FIGS. 1A-1D show a high-level process flow diagram for providing full-time protection services according to one embodiment of the present invention. The process described in this embodiment begins (at 101) when, in response to receiving a request for service through a network, a network management system (NMS) establishes a working path and a corresponding protection path through the network in accordance with a requested protection scheme. The requested protection scheme can be based on, for example, one of the protection schemes described above, such as '1+1 protection,' '1:1 protection,' or '1:N protection,' or it may be based on any other protection scheme known in the art. In one embodiment, the request for service may be a request to set up a protected path call between a first location and a second location in an optical transport network. As will be illustrated below, such requests may originate from either a management system or from a client device, for example. If the request is issued from a management system, the management system issuing the request may be an Element Management System (EMS), a Network Management System (NMS), an Operations Support System (OSS), or any other known management system that may be known or in use at the time.

The requested service can be established by directing the control plane portion of the network to provision a working path and a protect path through the network in accordance with the requested protection scheme. After the working and protect paths are established, the system (at 102) receives notification of the network segments that have been created along the working and protect paths. According to one embodiment, such notification(s) can be received at a 'protection policy server.' As indicated above, the 'protection policy server' (PPS) is a component in the network that carries out some or all of the decision-making processes associated with coordinating the dynamic establishment of protection paths in a timely manner. Stated differently, the purpose of the PPS is to function as the controller that keeps track of the working and the corresponding protect paths, and that determines when to notify the control plane to set up new protect paths. With knowledge of the current working-protection arrangement for the requested service, the system proceeds to wait for any protection switching notifications associated with such arrangement.

As indicated at step 103, so long as no failures occur on the working and protection paths, the working and protection paths will continue to operate according to the initial working-protection arrangement established above. The term 'failure,' as used herein, is to be construed broadly to refer to any event, requirement, motivation, etc., that causes a particular path to become unusable for its intended purpose. When a failure does occur on the working path, for example, and the protect path becomes the new working path (in accordance with the basic protection scheme associated with the initial working-protection arrangement), the protection policy server can be notified of the protection switching event by an element management system or directly from a network element. In some cases, protection switching may occur using traditional Automatic Protection Switching (APS) functionality in the network element associated with the failure, and the protect path will become the new working path. As would be readily understood by one of ordinary skill in the art, the handling of failed working paths in all scenarios is implementation specific. For example, failed working paths can be torn down and their resources de-allocated immediately, or they can be kept in a degraded state, pending repairs.

While the term "protection switching" is typically used herein to refer to the act of reassigning a protection path to be the new working path for a failed working path, the term "protection switching event" broadly refers to any event that is associated with the operation or failure of one or both of the working and protection paths in a working-protection arrangement; similarly, the term "protection switching notification" broadly refers to any notification that is associated with the operation or failure of one or both of the working and protection paths in a working-protection arrangement.

If a protection switching notification is received (103) by the PPS/NMS, indicating a failure in one or both of the working and protection paths, the process proceeds to step 104. At this stage, the system determines whether the received notification is a "Case 1" notification, meaning that there was a failure on the working path, and protection switching was successfully performed. If the answer to the question at step 104 is "no," the process proceeds to step 109. However, if the answer to the question at step 104 is "yes," meaning protection switching in the prior working-protection arrangement was performed successfully, the process advances to step 105, where the system determines what type of new protection path (e.g., characteristics, routing constraints, etc) needs to be created to support the new working path. The protection policy server may base this determination on one or more requirements or characteristics. For example, the type of new protect path to be created may be based on such information as explicit routing constraints, link cost, pre-emption, and diversity requirements, to name just a few. It may also include information pertaining to service level guarantees such as latency requirements.

In accordance with the determination made in step 105, the system (at 106) establishes the new protection path for the new working path and. Subsequently (at 107), the system receives notification (e.g., via an EMS or directly from a network element) regarding the establishment of the new protection path and the current working-protection arrangement. At step 108, all resources allocated to the failed working path are released. The process then returns to step 103, where the system continues to wait for other protection switching notifications to be received.

If the answer to the question at step 104 is "no," the process proceeds to step 109, where the system determines whether the received notification is a "Case 2" notification, meaning that only the protection path failed, and no protection switching event is needed. If the answer to the question at step 109 is "no," the process proceeds to step 114. However, if the answer to the question at step 109 is "yes," meaning protection switching is not needed, but restoration of the failed protection path is, the process advances to step 110, where the system determines what type of new protection path (e.g., characteristics, routing constraints, etc) needs to be created to replace the failed one. Based on this determination, the system (at 111) establishes the new protection path to replace the failed one and, subsequently (at 112), receives notification regarding the establishment of the new protection path and the current working-protection arrangement. At step 113, all resources allocated to the failed protection path are released. The process then returns to step 103, where the system continues to wait for other protection switching notifications.

If the answer to the question at step 109 is "no," the process proceeds to step 114, where the system next determines whether the received notification is a "Case 3" notification, meaning that protection switching failed, due to the fact that simultaneous failures occurred on both the working and protection paths. If the answer to this question is also "no," the process can proceed to step 121, where the system may be configured to handle still other types of protection switching notifications. However, if the answer to the question at step 114 is "yes," meaning that both the working and protection paths have failed, the process advances to step 115, where the system determines what type of new working path needs to be created to replace the failed one. Based on this determination, the system (at 116) establishes the new working path to replace the failed one. Similarly, at step 117, the system determines what type of new protection path needs to be created, and, at step 118, establishes such new protection path to replace the failed one. At step 119, the system receives notification regarding the establishment of the new working and protection paths and the current working-protection arrangement. At step 120, all resources allocated to the failed working and protection paths are released. The process then returns to step 103, where the system continues to wait for other protection switching notifications.

Figure 2A:
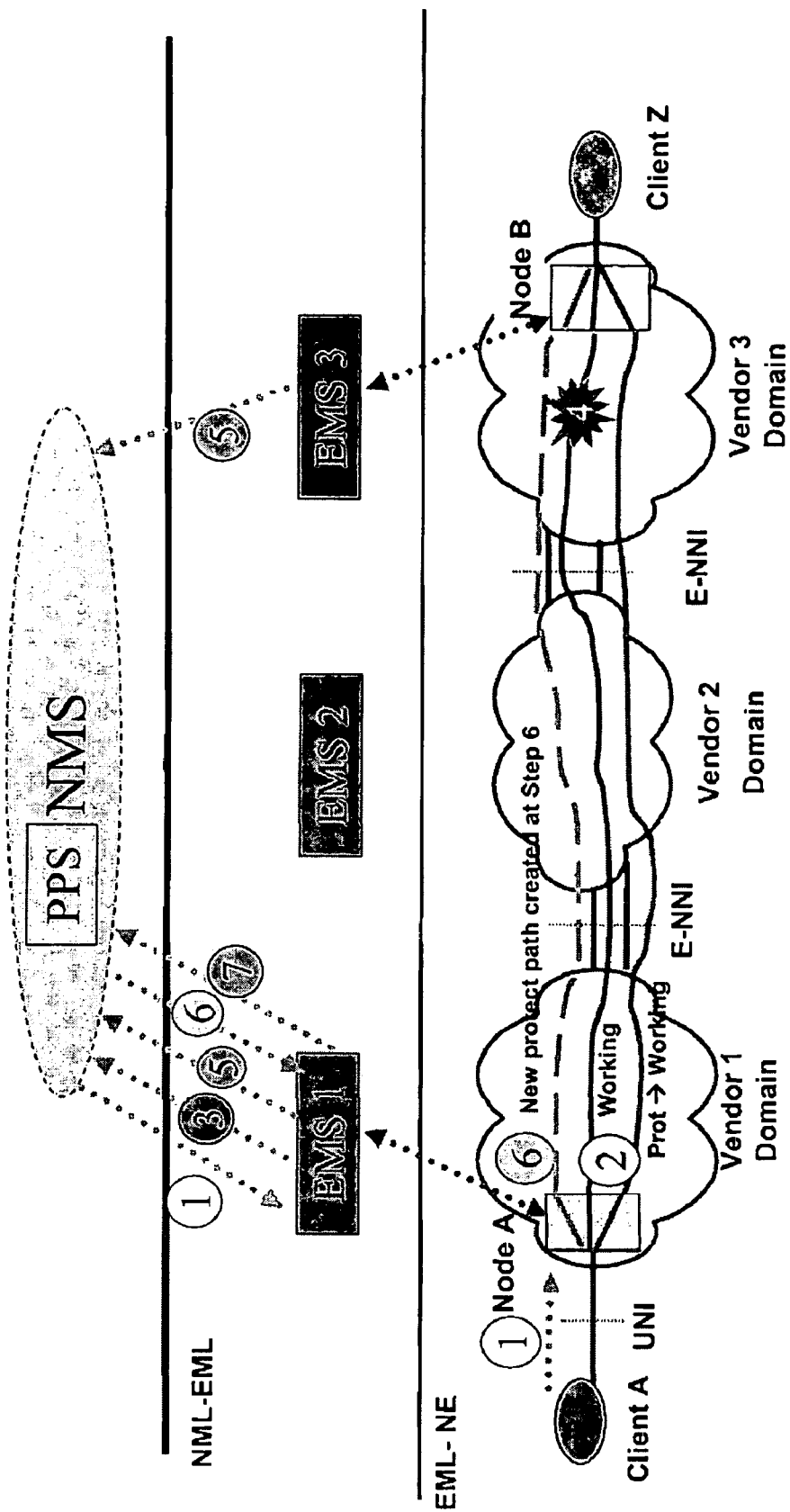
FIGS. 2A-2C show exemplary embodiments of a full-time protection service in the context of a '1+1 protected path' request.
Figure 2B:
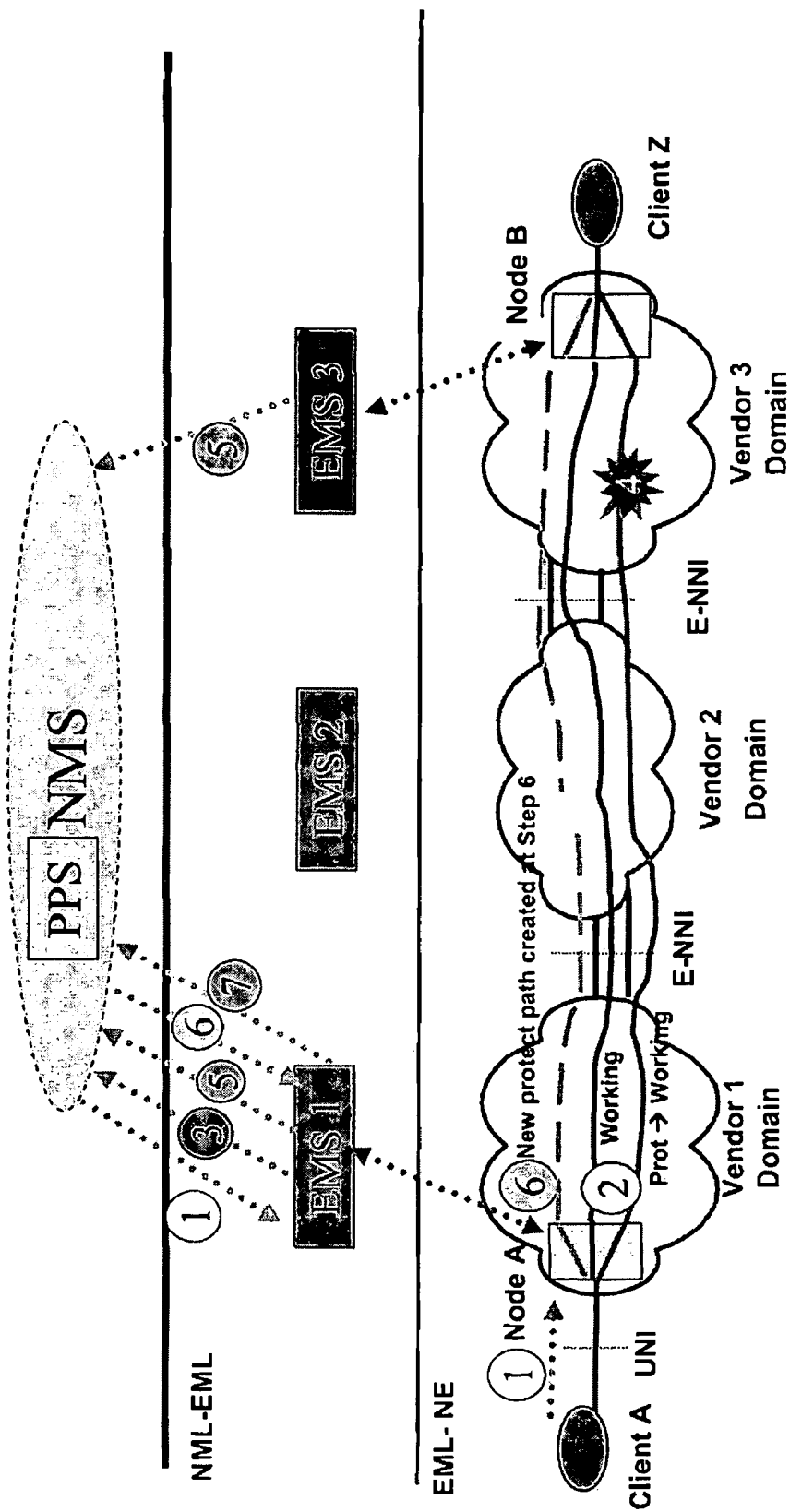
Figure 2C:
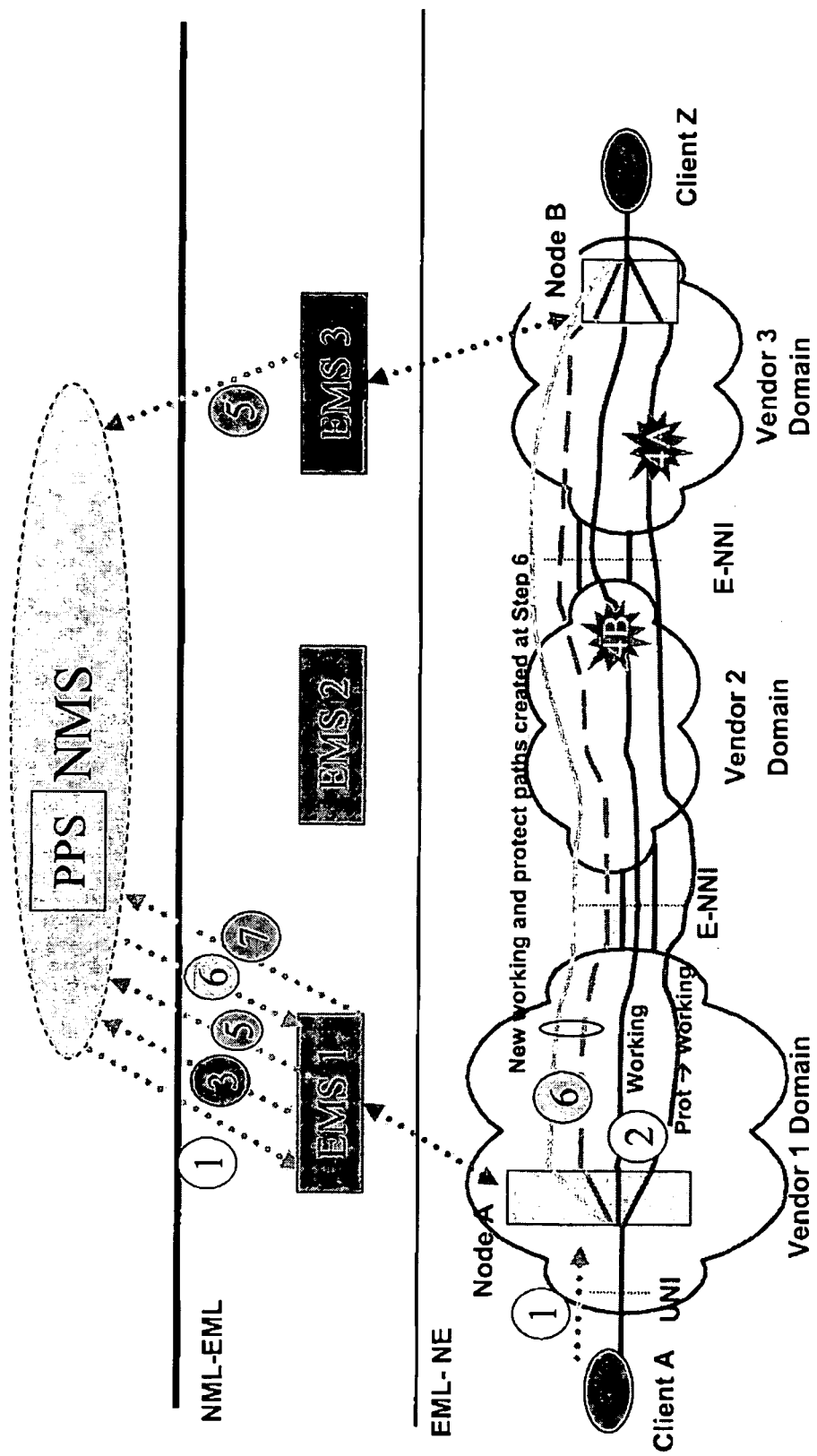

FIGS. 2A-2C show exemplary embodiments of a full-time protection service in the context of a '1+1 protected path' request. As described above, a service with basic '1+1 protection' provides a customer with a pair of dedicated 'working' and 'protect' paths, where the protect path is used to simultaneously carry the same traffic as the working path. When the working path fails, a switchover to the protect path will occur enabling the customer to still receive its service. As with other known protection schemes, basic '1+1 protection' does not provide the customer with a similar level of protection after a first failure occurs in the working path (i.e., when the protect path becomes the active working path, there is no similar level of backup protection should another failure occur). Accordingly, FIGS. 2A-2C depict a series of events that illustrate how embodiments of the present invention can be used to provide full-time protection to a customer requesting '1+1 protected path' service through a network.

In particular, FIG. 2A shows an exemplary sequence of events that may occur when there is a failure in the working path of a '1+1' working-protection arrangement. In this embodiment, the process begins (at Step 1) with a request for a '1+1 protected path' for a call between a first client (Client A) and a second client (Client Z). This request may, for example, originate from either a network management system (NMS) or directly from a client device (e.g., Client A). The request for service can be directed to an intelligent control plane that is responsible for provisioning (Step 2) both the working and protect paths through the network. As mentioned above, the control plane within a connection-oriented network generally includes those functions that are related to networking control capabilities such as routing, signaling and resource and service discovery, to name just a few. In FIGS. 2A-2C (and subsequent figures), the control plane is graphically represented by the interconnection of network elements located below the element-management-layer/network-element (EML-NE) interface.

A control plane consists of a set of routing and signaling protocols that enable a network to achieve automated functions. As indicated above, such functions may include auto-discovery and self-inventory of network resources, topology, and connection map; end-to-end path calculations subject to traffic engineering constraints; dynamic end-to-end path setup and teardown in a single-step and single-ended fashion; and support for a variety of protection and restoration schemes, to name just a few. In practice, the 'control plane' (or the functionality associated therewith) is implemented either distributively within network elements throughout the network or centrally in centralized controllers that reside in separate platforms, which are also known as control plane by proxy. Accordingly, both management systems (e.g., EMS1) and client devices (e.g., Client A) can communicate with the 'control plane' portion of such network elements to request that certain operations be performed, such as the provisioning of a new working or protect path as shown in Step 2.

If the request for service is made by a client device (e.g., Client A), the request can be directed to the control plane via a user network interface (UNI) connection, which connects the client to a particular network domain (e.g., Vendor 1 Domain). If the request is instead made by the NMS, the request may be passed to an appropriate element management system (e.g., EMS1), which then takes over responsibility for directing the control plane to provision both the working and protect paths through the network. As would be readily understood by one of ordinary skill in the art, communication between a NMS and an EMS can be facilitated via an appropriate network management layer/element management layer (NML-EML) interface, using, for example, a "TMF513/608" (ver 3.5 and beyond) message set. Similarly, communication between a NMS and a network element within the control plane can occur via an appropriate network management layer/network-element (NML-NE) interface, using a vendor specific "TL1" message set. As would also be understood by one of ordinary skill in the art, communications within the control plane may include the following (and future versions of the following): (1) UNI messages specified in Off UNI 2.0

Implementation Agreement; (2) E-NNI signaling messages as specified in Off NNI 1.0 signaling Implementation Agreement; and (3) I-NNI signaling messages are vendor-specific, mostly based on IETF GMPLS signaling standards.

The working and protect paths (in this example) are shown passing through three different network domains (e.g., Vendor Domains 1, 2 and 3), each of which is connected to the next via an external network-to-network interface (E-NNI) connection. After the control plane has been used to establish the initial working and protect paths, the protection policy server (PPS) can be notified (either directly or via the NMS) of all segments along both the working and protect paths. As indicated in Step 3, such notification may occur via the one or more element management systems (e.g., EMS1) associated with the respective network domains located along the working and protect paths. Note that in this embodiment, the PPS is depicted as being an integral portion of the NMS. However, in another embodiment, the PPS can be a standalone software module configured to operate at a different point (or points) within the network.

Continuing with the present example, now suppose that (at Step 4) a fiber cut on the working path triggers a protection switching event in which the (original) protection path is assigned to be the new working path. When this occurs, the PPS (at Step 5) can be notified via EMS1 or EMS3, for example, of the protection switching event and the new working path. In response to such notification, the PPS (at Step 6) can instruct the control plane (e.g., via EMS1) to provision a new path to be the protect path for the new working path. As described above, the PPS can be configured to determine the type of new protect path that needs to be created based on, for example, the protection and restoration policies associated with this particular service. When the provisioning of the new protect path is complete, the PPS (at Step 7) can be notified of the new working path and protect path arrangement. By repeating these actions each time a failure occurs in the current working path, the system can be configured to provide a customer with an 'always on 1+1 protection' type of service.

FIG. 2B shows an exemplary sequence of events that that may occur, in accordance with one embodiment of the present invention, when there is a failure on the protect path and not the working path of the '1+1' working-protection arrangement. In other words, suppose that (at Step 4) a fiber cut occurs on the protect path instead of the working path. In this case, no protection switching event would occur because the working path is still operational. However, the customer's working path is now without the same level of protection it had prior to such failure on the protect path. To remedy this, the PPS (at Step 5) can be notified via EMS1 or EMS3, for example, of the protection path failure, and in response to such notification, the PPS (at Step 6) can instruct the control plane (e.g., via EMS1) to provision a new protect path to replace the failed protect path. When the provisioning of the new protect path is complete, the PPS (at Step 7) can be notified (e.g., via EMS1) of the new protect path, thus ensuring that the PPS is kept aware of the current working path and protect path arrangement.

FIG. 2C illustrates an exemplary sequence of events that may occur when there are simultaneous failures on both the working and the protect paths of the '1+1' working-protection arrangement. In this case, the protection switching event that would be facilitated by the failure on the working path would itself fail due to the simultaneous failure of the protect path. When addressing this situation, the PPS (at Step 5) can be notified (e.g., via EMS1 or EMS3) of the simultaneous failures on both the working and the protect paths, and in response to such notification, the PPS (at Step 6) can instruct the control plane (e.g., via EMS1) to provision a new pair of 1+1 working and protect paths to replace the failed pair. When the provisioning of the new pair of working and protect paths is complete, the PPS (at Step 7) can be notified of the new 1+1 working and protect path arrangement.

Figure 3A:
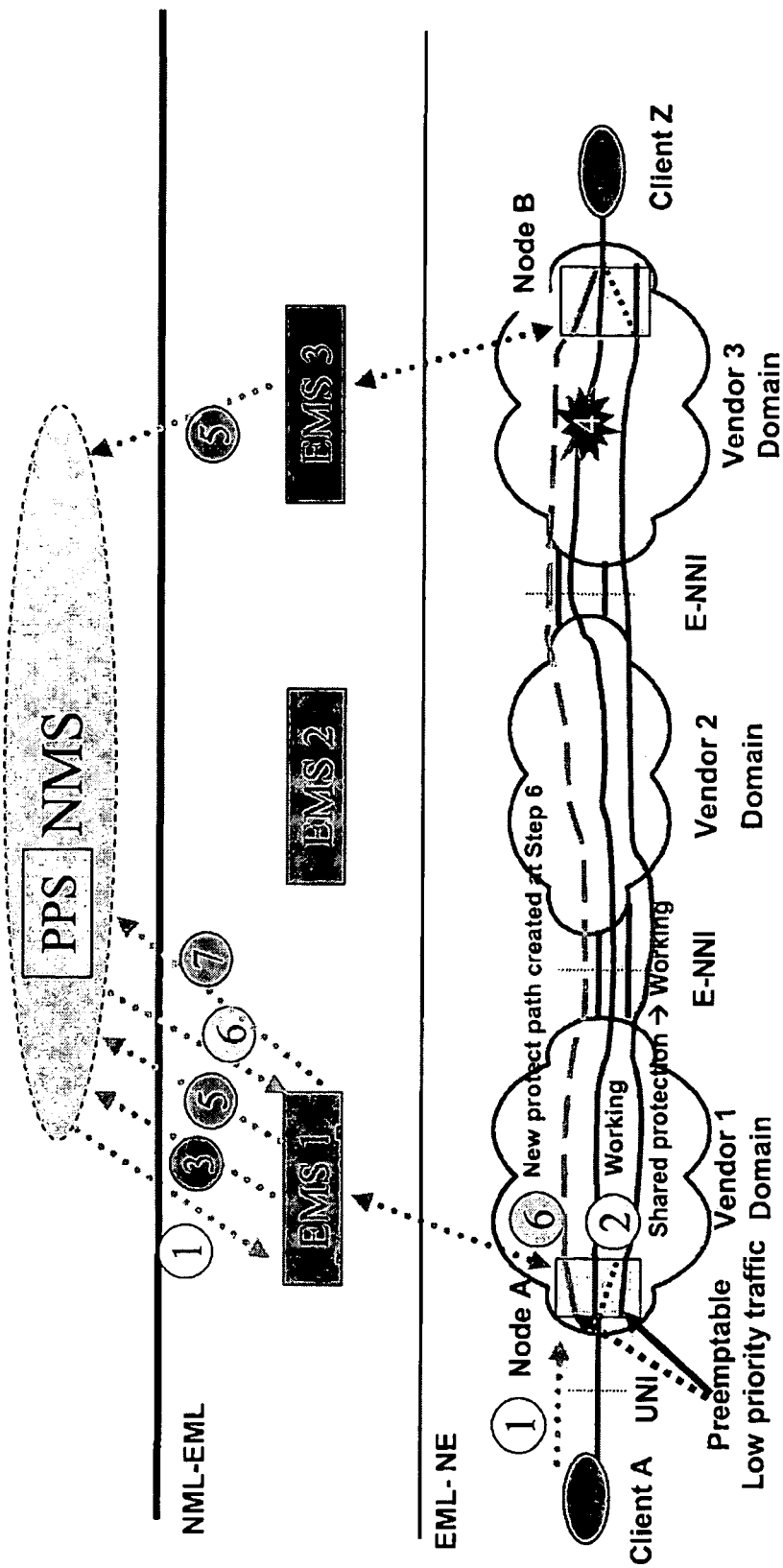
FIGS. 3A-3C show exemplary embodiments of a full-time protection service in the context of a '1:1 protected path' request.
Figure 3B:
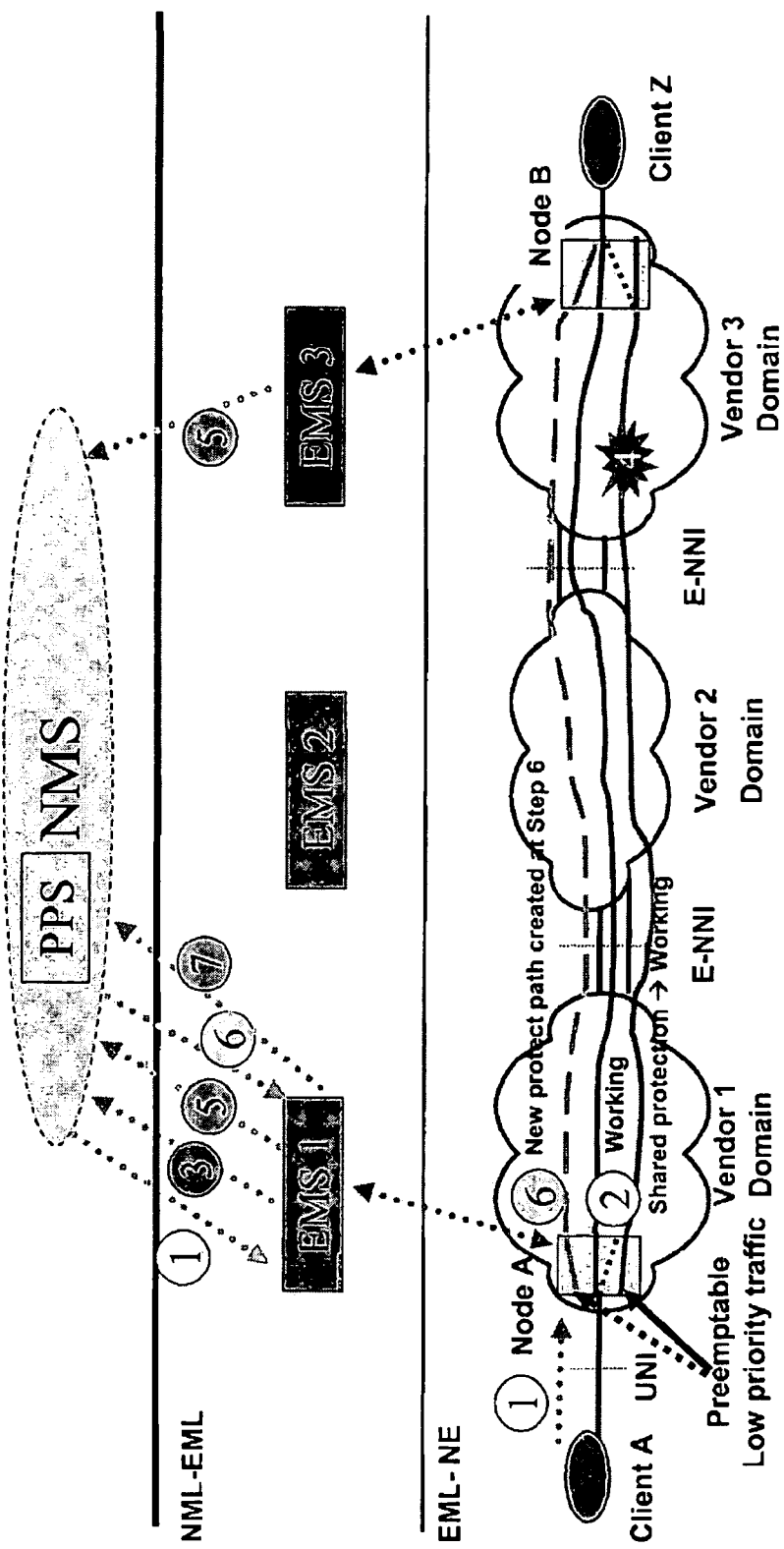
Figure 3C:
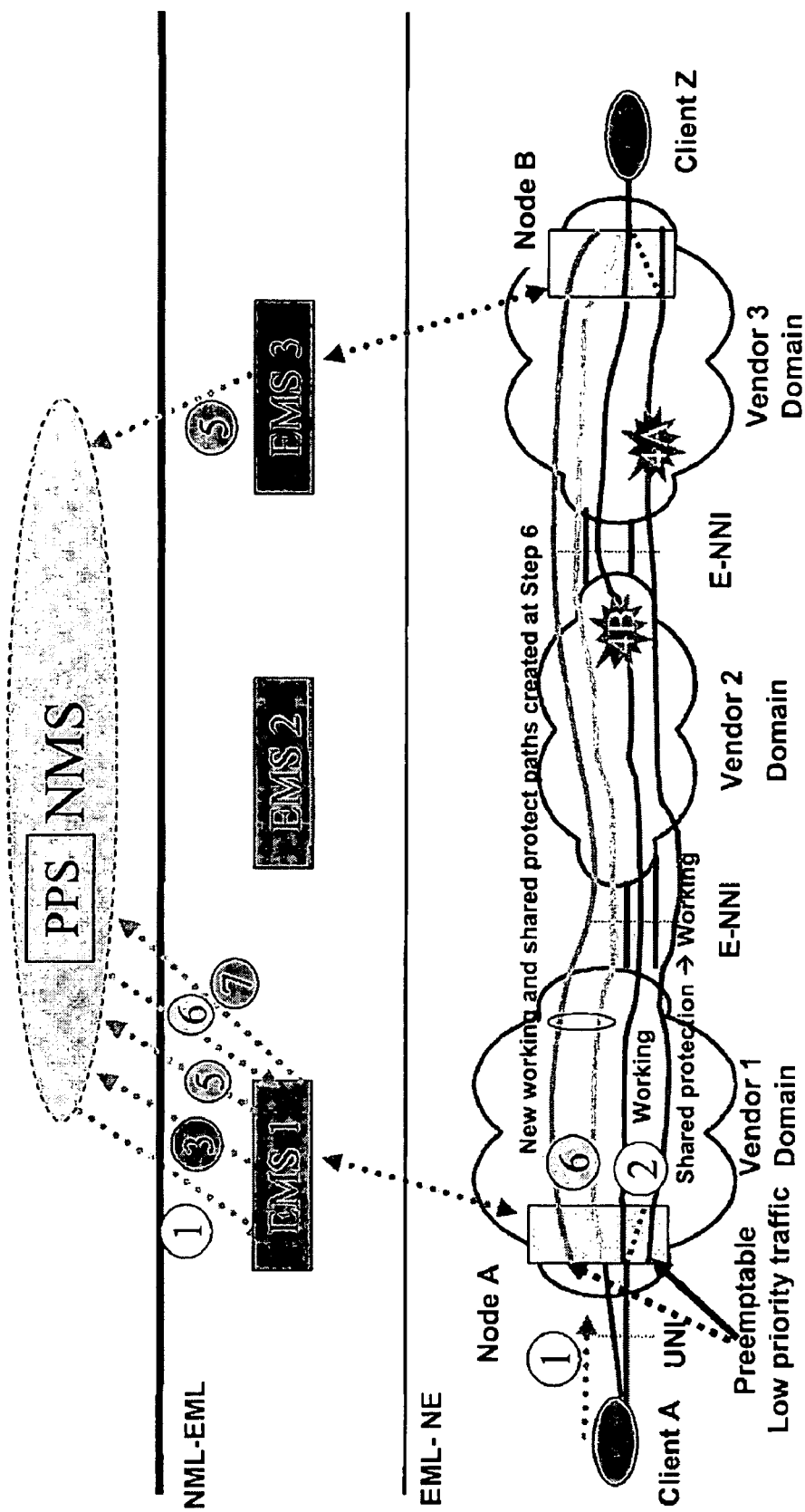

FIGS. 3A-3C show exemplary embodiments of a full-time protection service in the context of a '1:1 protected path' request. As described above, a service with 1:1 protection provides a customer with a 'working' path and a shared 'protect' path. The scheme allows the protection path to be used to carry other preemptable traffic when the working path is in a normal operating mode. When the working path fails, the scheme will preempt the existing traffic on the protection path, and then switch traffic on the previous working path over to the protect path, enabling the customer to still receive its service. As with other known protection schemes, basic '1:1 protection' does not provide the customer with a similar level of protection after a first failure occurs in the working path. Accordingly, FIGS. 3A-3C depict a series of events that illustrate how exemplary embodiments of the present invention can be used to provide full-time protection to a customer requesting '1:1 protected path' service through a network.

Specifically, FIG. 3A shows an exemplary sequence of events that may occur when there is a failure in the working path of a '1:1' working-protection arrangement. In this embodiment, the process begins (at Step 1) with a request for a '1:1 protected path' for a call between a first client (Client A) and a second client (Client Z). Once again, this request may originate from either a network management system (NMS) or directly from a client device (e.g., Client A), and the request can be directed to an intelligent control plane that is responsible for provisioning both the working and the shared protection paths through the network (as indicated in Step 2). If the request for service is made by a client device, the request can be directed to the control plane via a user network interface (UNI) connection, which connects the client to a particular network domain (e.g., Vendor 1 Domain). If the request is made instead by the NMS, the request may be passed to an appropriate element management system (i.e., usually the EMS that manages the originating NE—EMS1), which then takes over responsibility for directing the control plane to provision both the working and the shared protect paths through the network. Communication between the NMS and the one or more EMSs may be facilitated via an appropriate network management layer/element management layer (NML-EML) interface.

In this example, the working path and the shared protect path are shown passing through three different network domains, each of which is connected to the next via an external network-to-network interface (E-NNI) connection. After the control plane has been used to establish the initial working and protect paths, the protection policy server (PPS) can be notified (either directly or via the NMS) of all segments along both the working and protect paths. As indicated in Step 3, such notification may occur via the one or more element management systems associated with the respective network domains located along the working and protect paths.

Now suppose, for example, that (at Step 4) a fiber cut affecting the working path triggers end points to perform 1:1 protection switching, which, in this case, includes preempting low priority traffic on the protect path and assigning the (original) protect path to be the new working path. When this occurs, the PPS can be notified (at Step 5) of the protection switching event and the change of the working path. In response to such notification, the PPS (at Step 6) can instruct the control plane to provision a new path through the network to be the protection path for the new working path. Once provisioned, use of the new protect path for other low priority traffic can also resume. As described above, the PPS can be configured to determine what type of new protection path needs to be created based on, for example, the protection and restoration policies associated with this particular service. When the provisioning of the new protect path is completed, the PPS (at Step 7) can be notified (e.g., via EMS1) of the new protection path and the now current working-protection arrangement. By repeating these actions each time a failure occurs in the current working path, the system can be configured to provide a customer with an 'always on 1:1 protection' type of service.

FIG. 3B shows an exemplary sequence of events that that may occur, in accordance with one embodiment of the present invention, when there is a failure on the protect path and not the working path of the '1:1' working-protection arrangement. In other words, suppose that (at Step 4) a fiber cut occurs on the protect path instead of the working path. In this case, no protection switching event would occur because the working path is still operational. However, the customer's working path is now without the same level of protection it had prior to such failure on the protect path. To remedy this, the PPS (at Step 5) can be notified via EMS1 or EMS3, for example, of the protection path failure, and in response to such notification, the PPS (at Step 6) can instruct the control plane (e.g., via EMS1) to provision a new protect path to replace the failed protect path. When the provisioning of the new protect path is complete, the PPS (at Step 7) can be notified (e.g., via EMS1) of the new protect path, thus ensuring the PPS is kept aware of the current working-protection arrangement.

FIG. 3C illustrates an exemplary sequence of events that may occur when there are simultaneous failures on both the working and the protect paths of the '1:1' working-protection arrangement. In this case, the protection switching event that would be facilitated by the failure on the working path would itself fail due to the simultaneous failure of the protect path. When addressing this situation, the PPS (at Step 5) can be notified (e.g., via EMS1 and/or EMS3) of the protection-switching-event failure caused by the simultaneous failures on both the working and protect paths. In response to such notification, the PPS (at Step 6) can instruct the control plane (e.g., via EMS1) to provision a new pair of 1:1 working and protect paths to replace the failed pair. When the provisioning of the new pair of working and protect paths is complete, the PPS (at Step 7) can be updated as to the new 1:1 working and protect path arrangement.

Figure 4A:
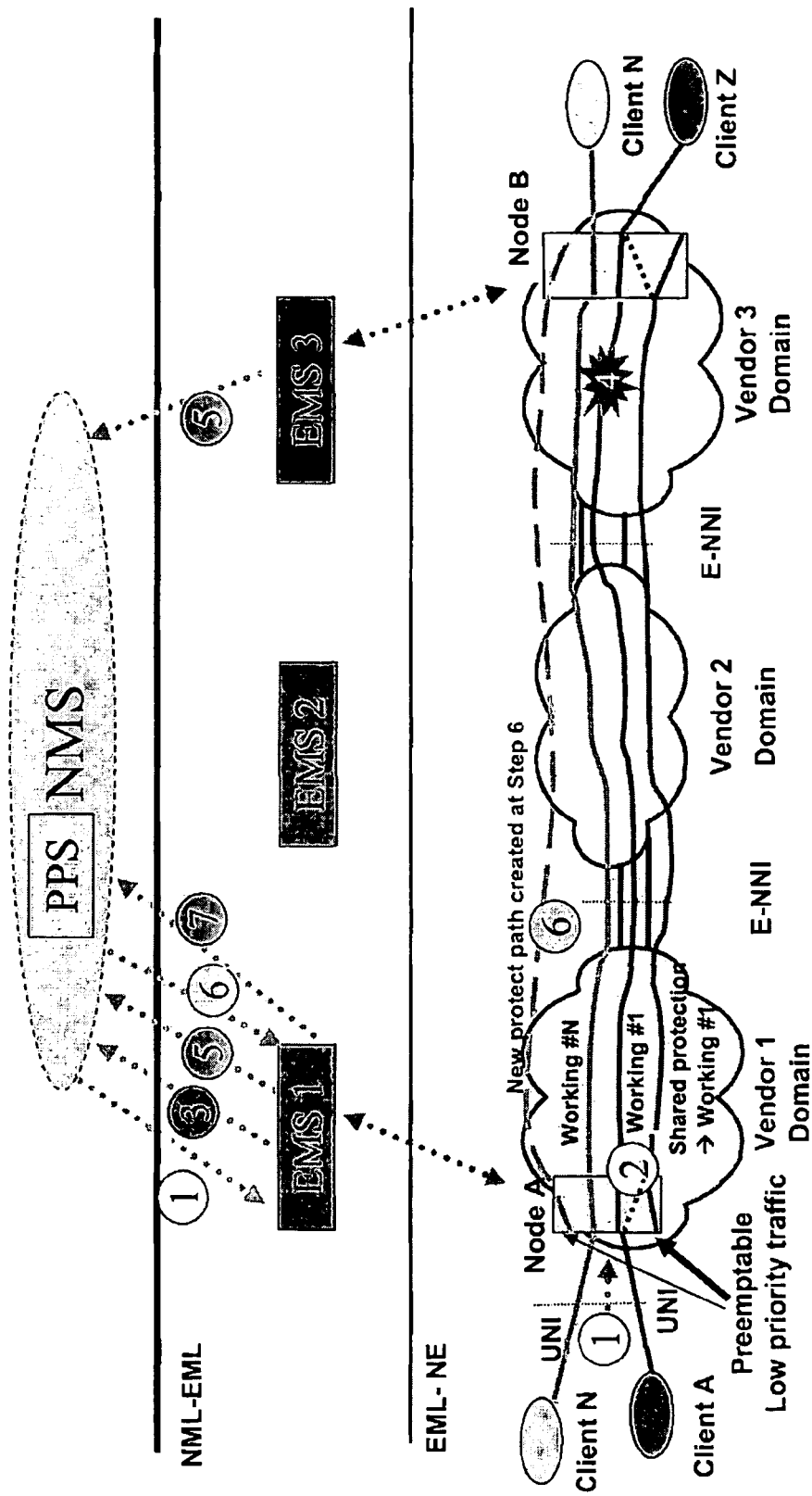
FIGS. 4A-4C show exemplary embodiments of a full-time protection service in the context of a '1:N protected path' request.
Figure 4B:
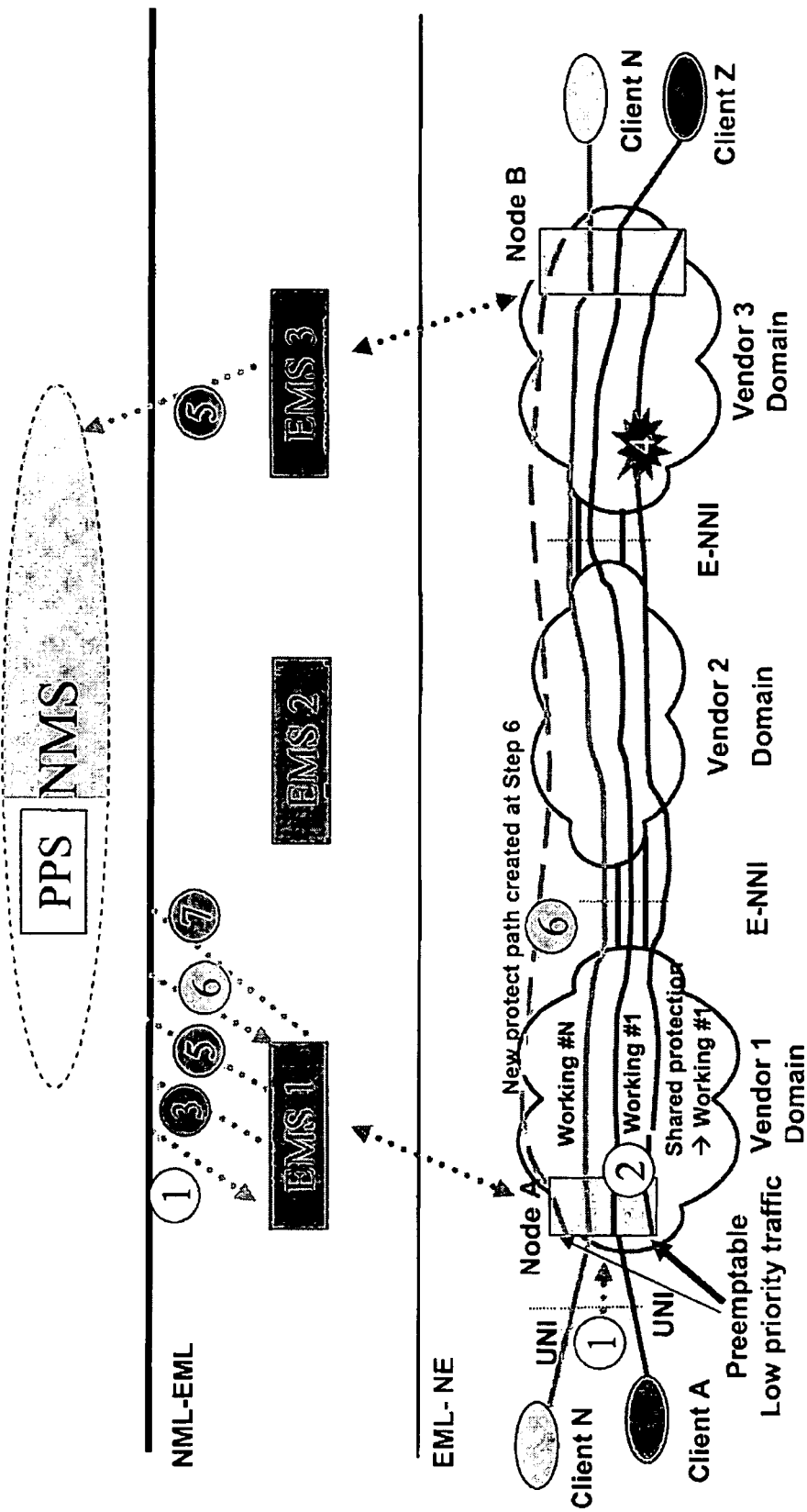
Figure 4C:
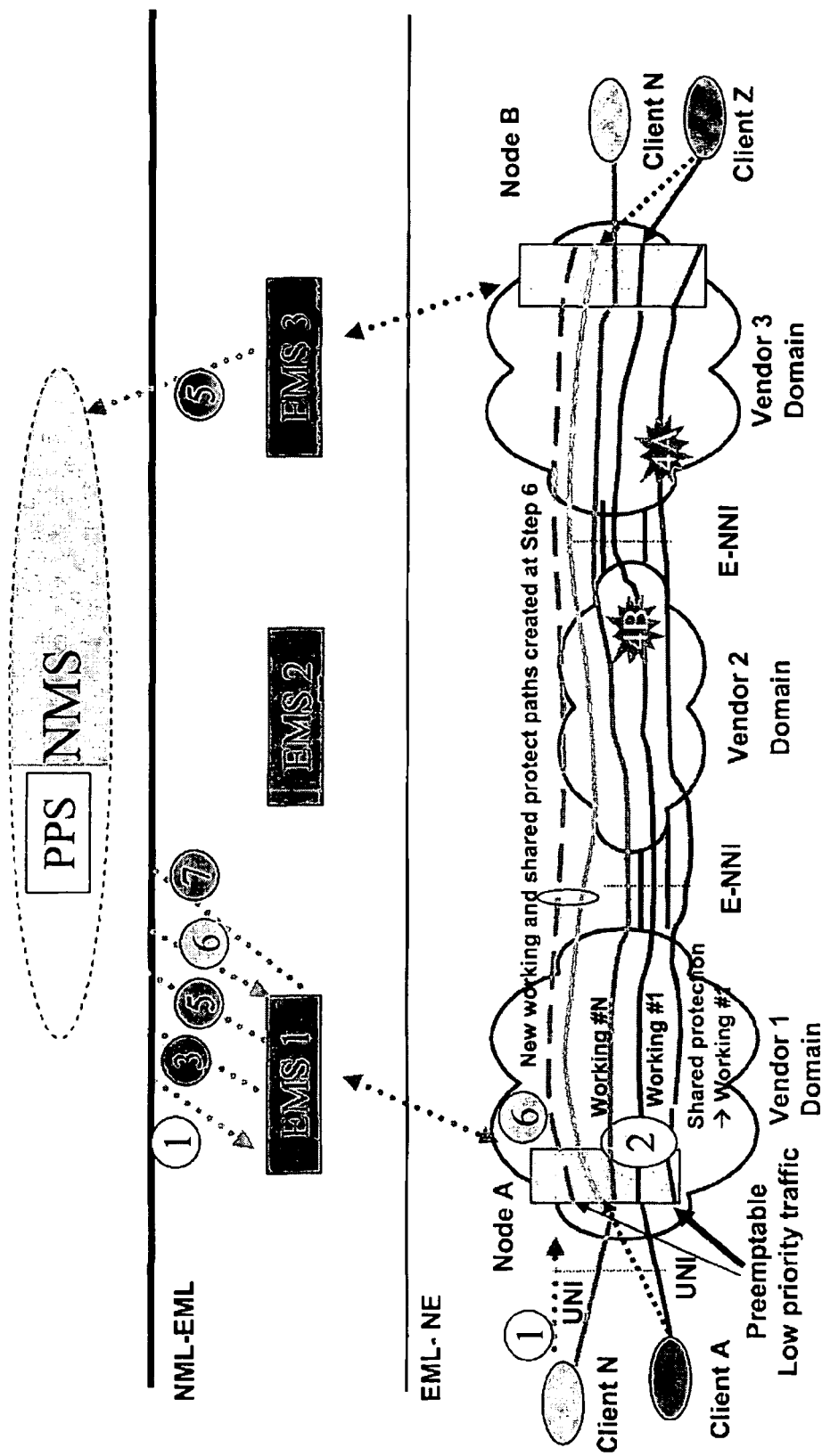

FIGS. 4A-4C show exemplary embodiments of a full-time protection service in the context of a '1:N protected path' request. As described above, a service with 1:N protection provides a single 'protection' path (either shared or dedicated) to protect N customers' 'working' paths. When any one of the N working paths fails, the scheme will switch in the protection path to replace the failed working path. When all N working paths are in normal state, the protection path can carry other preemptable traffic, just as the 1:1 scheme does. As with other known protection schemes, basic '1:N protection' does not provide the customer with a similar level of protection after a first failure occurs in the working path. Accordingly, FIGS. 4A-4C depict a series of events that illustrate how exemplary embodiments of the present invention can be used to provide full-time protection to a customer requesting '1:N protected path' service through a network.

Specifically, FIG. 4A shows an exemplary sequence of events that may occur when there is a failure on one of the N working paths of a '1:N' working-protection arrangement. In this embodiment, the process begins (at Step 1) with a request for a '1:N protected path' for a call between a first client (Client A) and a second client (Client Z). The request, which may originate from either a network management system (NMS), or directly from a client device, for example, can be directed to the control plane portion of the network. Upon receiving the request for a 1:N protected path, the control plane (at Step 2) can provision a working path through the network and associate such working path with a pre-provisioned shared protection path. The N working paths and the shared protection path, in this example, are shown passing through three different network domains. The PPS can then be notified (e.g., via EMS1) of all segments along the working path and its association with the shared (pre-provisioned) protection path, as indicated in Step 3.

Now suppose that (at Step 4) a failure occurs on one of the N working paths (e.g., Working #1), which triggers end points to perform 1:N protection switching and assign the (original) shared protection path to be the new working path for "Working #1." When this occurs, the PPS can be notified (at Step 5) of the protection switching event and the change of the working path for Working #1. In response to such notification, the PPS (at Step 6) can instruct the control plane to provision a new path to be the protection path for the new set of N working paths. As described above, the PPS can be configured to determine what type of new protection path needs to be created based on, for example, the protection and restoration policies associated with this particular service. When the provisioning of the new protect path is complete, the PPS (at Step 7) can be notified of the new protect path and the current working-protection arrangement. By repeating these actions each time a failure occurs in the current working path, the system can be configured to provide a customer with an 'always on 1:N protection' type of service.

FIG. 4B shows an exemplary sequence of events that that may occur, in accordance with one embodiment of the present invention, when there is a failure on the shared protect path of the '1:N' working-protection arrangement. In other words, suppose that (at Step 4) a fiber cut occurs on the shared protect path instead of one of the N working paths. In this case, no protection switching event would occur because the N working paths are still operational. However, the N working paths are now without the same level of protection they had prior to the failure on the shared protection path. To remedy this, the PPS (at Step 5) can be notified via EMS1 or EMS3, for example, of the failure on the shared protection path. In response to such notification, the PPS (at Step 6) can instruct the control plane to provision a new shared protect path to replace the failed shared protect path. When the provisioning of the new protect path is complete, the PPS (at Step 7) can be notified (e.g., via EMS1) of the new protect path, thus ensuring the PPS is kept aware of the current working-protection arrangement.

FIG. 4C illustrates an exemplary sequence of events that may occur when there are simultaneous failures on at least one of the N working paths and the shared protect path of the '1:N' working-protection arrangement. In this case, the protection switching event that would be facilitated by the failure on the (at least one) working path would itself fail due to the simultaneous failure of the protect path. When addressing this situation, the PPS (at Step 5) can be notified (e.g., via EMS1 or EMS3) of the 1:N protection switching failure caused by the simultaneous failures on both the (at least one) working path and the shared protect path. In response to such notification, the PPS (at Step 6) can instruct the control plane (e.g., via EMS1) to provision new working paths for all failed working paths, and create a new shared protect path to replace the failed one. When the provisioning of the new working and protect paths is complete, the PPS (at Step 7) can be updated as to the new working paths and the shared protect path.

Figure 5:
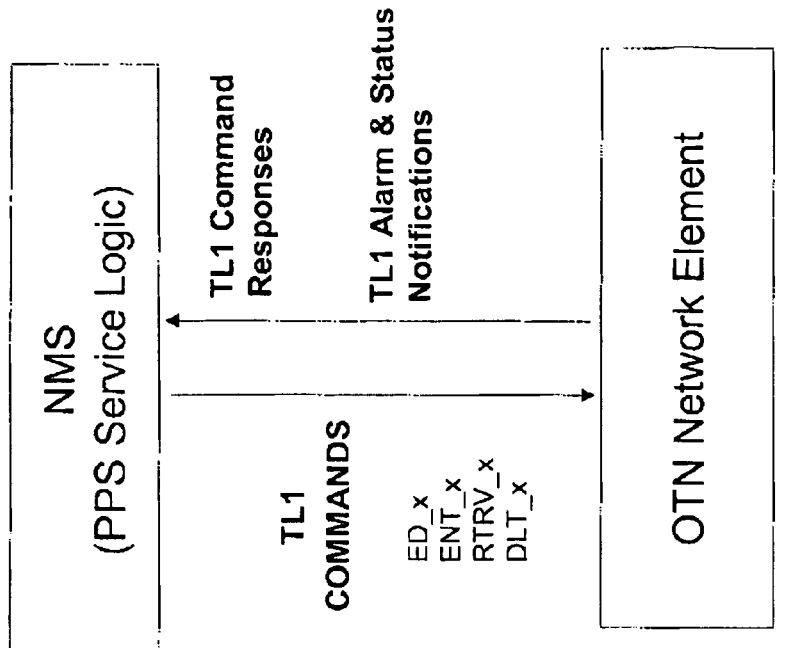
FIG. 5 shows the types of message flows that can be used in an optical transport network (OTN) when carrying out embodiments implemented according to the present invention.
Figure 5:
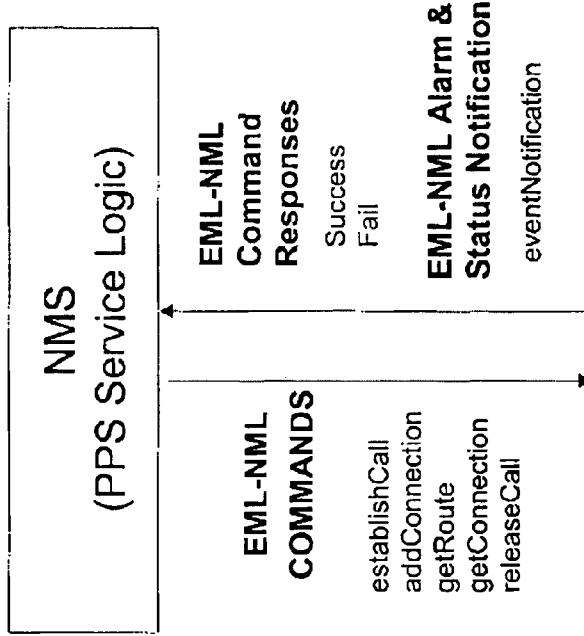

FIG. 5 illustrates the types of message flows that can be used in an optical transport network (OTN) when carrying out embodiments implemented according to the present invention. For example, communications between a NMS that includes PPS service logic and an EMS may occur using a "TMF513/608" message set or a vendor-specific extension of the message set. This exemplary message set, as would be known to one of ordinary skill in the art, includes such commands as "establishCall," "addConnection," "getRoute," "getConnection" and "releaseCall," which allow the PPS/NMS to carry out the types of functionality described above, including, but not limited to, establishing new working and protect paths, obtaining information on existing paths and releasing previously allocated resources. The message set also allows the EMS to provide the PPS/NMS with command responses (i.e., indicating the success or failure of previously submitted commands) and alarm and status notifications (e.g., protection switching notifications, as discussed above). The right-hand portion of FIG. 5 further illustrates how similar information exchanges can occur between the PPS/NMS (or an EMS) and individual network elements in the OTN. As mentioned above, communications to and from the network element level typically involve the use of vendor specific "TL1" message sets.

Although exemplary embodiments discussed above were described in conjunction with provisioning a new protect path after failure of a working path, one or ordinary skill in the art would readily recognize that it may also be desirable to reprovision a new protect path in situations where the working path stays up but the current protect path experiences a failure. In other words, the present invention explicitly contemplates embodiments where a new protect path can be dynamically allocated in response to a failure in the previous protect path (instead of the working path), thereby ensuring that the system (once again) maintains the same level of service by continuing to provide a backup (i.e., protect path) to the active working path.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method, comprising:
   (1) establishing a current working path corresponding to a first path through a network between a first location and a second location and a current protect path corresponding to a second path through the network between the first location and the second location, the current working path and the current protect path forming a current working-protection arrangement configured to facilitate communication between the first and second locations;
   (2) receiving information associated with the establishment of the current working path and the current protect path;
   (3) receiving notification of a failure of the current working path and the current protect path;
   (4) determining what type of new working path and new protect path need to be created based at least in part on one or more protection policies associated with the working-protection arrangement between the first location and the second location;
   (5) establishing the new working path and the new protect path through the network between the first location and the second location and releasing resources of the failed current working path and the failed current protect path;
   (6) receiving information associated with the establishment of the new working path as the current working path and the new protect path as the current protect path; and
   (7) repeating Steps (3), (4), (5) and (6) each time a failure occurs on at least one of the current working path and current protect path.

2. The method of claim 1, wherein the notification received in Step (3) indicates that there was a failure on the current working path which facilitated a reassignment of the current protect path to be the current working path.

3. The method of claim 1, wherein the current protect path is a dedicated protection path used to simultaneously carry the same traffic as the current working path when the current working path is in a normal operating mode.

4. The method of claim 1, wherein the current protect path is a shared protection path that is used to carry preemptable traffic when the current working path is in a normal operating mode.

5. The method of claim 1, wherein receiving information associated with the establishment of the current working path and current protect path comprises receiving information identifying all segments along both the working and protect paths.

6. The method of claim 1, wherein said establishing steps are carried out via an intelligent control plane in an optical transport network.

7. The method of claim 1, wherein notification of the failure is received from at least one of a network management system, an element management system and a network element.

8. The method of claim 1, wherein establishing the new working path and the new protect path through the network comprises dynamically allocating bandwidth for the new working path and the new protect path from a pool of available bandwidth resources in the network, rather than from pre-reserved dedicated bandwidth.

9. The method of claim 1, wherein the one or more protection policies associated with the working-protection arrangement include one or more of the following: routing constraints, link cost, pre-emption, diversity requirements, and service level guarantees.

10. A system, comprising:
    a control plane configured to establish a current working path corresponding to a first path through a network between a first location and a second location and a current protect path corresponding to a second path through the network between the first location and the second location, the current working path and the current protect path forming a current working-protection arrangement configured to facilitate communication between the first and second locations; and
    a protection policy server configured to receive information associated with the establishment of the current working path and current protect path, the protection policy server further configured to:
    (1) receive notification of a failure of the current working path and current protect path;
    (2) determine what type of new working path and new protect path need to be created based at least in part on one or more protection policies associated with the working-protection arrangement between the first location and the second location;

(3) establish via the control plane the new working path and the new protect path through the network between the first location and the second location and release resources of at least one of the failed current working path and the failed current protect path;

(4) receive information associated with the establishment of the new working path as the current working path the new protect path as the current protect path; and (5) repeat Steps (1), (2), (3) and (4) each time a failure occurs on at least one of the current working path and current protect path.

11. The system of claim 10, wherein the notification received in Step (1) indicates that there was a failure on the current working path which facilitated a reassignment of the current protect path to be the current working path.

12. The system of claim 10, wherein the current protect path is a dedicated protection path used to simultaneously carry the same traffic as the current working path when the current working path is in a normal operating mode.

13. The system of claim 10, wherein the current protect path is a shared protection path that is used to carry preemptable traffic when the current working path is in a normal operating mode.

14. The system of claim 10, wherein the current protect path operates as a shared protection path for two or more working paths which include the current working path when all such working paths are in a normal operating mode.

15. The system of claim 10, wherein the information associated with the establishment of the current working path and current protect path comprises information identifying all segments along both the current working path and current protect path.

16. The system of claim 10, wherein said control plane is an intelligent control plane in an optical transport network.

17. The system of claim 10, wherein establishing the new working path and the new protect path comprises dynamically allocating bandwidth for the new working path and the new protect path from a pool of available bandwidth resources in the network, rather than from pre-reserved dedicated bandwidth.

18. The system of claim 10, wherein the one or more protection policies associated with the working-protection arrangement include one or more of the following: routing constraints, link cost, pre-emption, diversity requirements, and service level guarantees.

19. A method, comprising:

(1) in response to a request for service, establishing a current working path corresponding to a first path through an optical transport network between a first location and a second location, and a current protect path corresponding to a second path through the optical transport network between the first location and the second location, the current working path and the current protect path forming a current working-protection arrangement configured to facilitate communication between the first and second locations;

(2) receiving notification of all segments along both the current working path and current protect path;

(3) receiving notification of a protection switching event that involves failure of the current working path and the current protect path;

(4) determining what type of new working path and new protect path need to be created based at least in part on one or more protection policies associated with the working-protection arrangement between the first location and the second location;

(5) establishing the new working path and the new protect path through the optical transport network between the first location and the second location to take the place of the current working path and the current protect path and releasing resources of the failed current working path and the current protect path;

(6) receiving notification of the establishment of the new working path as the current working path and the new protect path as the current protect path; and (7) repeating Steps (3), (4), (5) and (6) on occurrence of a failure on the current working path.

* * * * *